(12) United States Patent
Yamada et al.

(10) Patent No.: US 7,252,294 B2
(45) Date of Patent: Aug. 7, 2007

(54) WEATHER STRIP

(75) Inventors: Yoshinobu Yamada, Aichi-ken (JP); Satoshi Inagaki, Aichi-ken (JP); Hiroshi Kuzuya, Aichi-ken (JP)

(73) Assignee: Toyoda Gosei Co., Ltd., Aichi-ken (JP)

( * ) Notice: Subject to any disclaimer, the term of this patent is extended or adjusted under 35 U.S.C. 154(b) by 70 days.

(21) Appl. No.: 11/156,450

(22) Filed: Jun. 21, 2005

(65) Prior Publication Data

US 2006/0005471 A1    Jan. 12, 2006

(30) Foreign Application Priority Data

Jun. 25, 2004  (JP)  ............ P2004-187148

(51) Int. Cl.
*F16J 15/02* (2006.01)
*E06B 7/16* (2006.01)

(52) U.S. Cl. ............ 277/641; 277/647; 277/651; 277/921; 49/490.1; 49/498.1

(58) Field of Classification Search .......... 277/641, 277/642, 647, 651, 921; 49/490.1, 498.1; 428/122
See application file for complete search history.

(56) References Cited

U.S. PATENT DOCUMENTS

| 3,310,928 A * | 3/1967 | Weimar ............... 52/716.8 |
| 3,371,447 A * | 3/1968 | Ruff et al. ............. 49/490.1 |
| 4,148,961 A * | 4/1979 | Paulus et al. ............ 428/358 |
| 4,188,765 A * | 2/1980 | Jackson ............. 52/716.8 |
| 4,310,164 A * | 1/1982 | Mesnel ............. 277/642 |
| 4,430,374 A | 2/1984 | Ezaki |
| 4,472,469 A * | 9/1984 | Thies ............. 428/122 |
| 4,769,950 A | 9/1988 | Ogawa et al. |
| 4,787,668 A | 11/1988 | Kawase et al. |
| 4,959,081 A | 9/1990 | Mathellier |
| 4,982,529 A * | 1/1991 | Mesnel ............. 49/490.1 |
| 5,072,546 A | 12/1991 | Ogawa |
| 5,085,006 A | 2/1992 | Hayashi et al. |
| 6,395,371 B1 | 5/2002 | Nozaki et al. |
| 6,647,667 B2 | 11/2003 | Mine et al. |
| 6,684,574 B2 | 2/2004 | Hayashi |
| 7,097,180 B2 * | 8/2006 | Kuzuya et al. ............. 277/644 |
| 2005/0193635 A1 * | 9/2005 | Hemauer ............. 49/490.1 |

FOREIGN PATENT DOCUMENTS

| GB | 2172640 | * | 9/1986 |
| JP | B-2750641 | | 2/1998 |

* cited by examiner

*Primary Examiner*—Alison K. Pickard
(74) *Attorney, Agent, or Firm*—Posz Law Group, PLC

(57) ABSTRACT

A weather strip has a trim part adapted to be mounted on a flange, a seal part having a hollow portion and a cover lip. The trim part has a bottom wall portion, and an interior and an exterior side wall portions which constitute a pair of side wall portions and is formed into a shape, as a whole, having a substantially U-shaped cross section, and an insert of a center bonded type is embedded in the interior of the trim part so constructed. In a skeletal piece of the insert, an angle θa formed by a bottom wall part embedded in the bottom wall portion and an internal part embedded in the interior side wall portion and an angle θb formed by the bottom wall part and an external part embedded in the exterior side wall portion are made to form acute angles.

8 Claims, 4 Drawing Sheets

WEATHER STRIP

BACKGROUND OF THE INVENTION

1. Field of the Invention

The present invention relates to a weather strip having a trim part of a substantially U-shaped cross section.

2. Related Art

In general, for example, a weather strip made of a rubber material such as EPDM is provided on a peripheral portion of a door opening in a body of a vehicle such as an automobile. The weather strip is formed into an elongated shape having a constant cross-sectional shape by extrusion molding. In addition, as shown in FIG. 6A, a weather strip 51 has a trim part 52 that is held by being fitted on a flange along a peripheral portion of the door opening and a hollow seal part 53 that is provided so as to protrude from the trim part 52. The trim part 52 includes a bottom portion 54, and an interior side wall portion 55 and an exterior side wall portion 56 which are extend substantially in parallel from the bottom portion 54 and is formed into a shape having a substantially U-shaped cross section as a whole. A metallic insert 57 is embedded in the interior of the trim part 52 in order to hold the substantially U-shaped cross section.

In assembling the weather strip 51 like this to a corner portion of the peripheral portion of the door opening in the vehicle body, the weather strip 51 needs to be bent relative to a longitudinal direction thereof so as to conform to a curved shape of the corner portion. Here, when the curvature of the curved shape is large, there may exist a risk that a so-called open deformation of the trim part occurs in which an opening in the substantially U-shaped cross section of a trim part 58 opens as shown in FIG. 6B. In a weather strip 59 in which the open deformation of the trim part occurs, a gap is generated between the flange and the weather strip itself, leading to drawbacks that the external appearance is deteriorated and that the holding force is reduced to facilitate the dislocation of the weather strip.

Then, in order to make the opening width of the trim part corresponding to the corner portion narrower than that of the trim part corresponding to the straight portion, there have been considered countermeasures in which the opening width is made to vary depending upon longitudinal positions of the weather strip (for example, refer to Japanese Patent No. 2750641) and in which clamping or compressing work is applied to the portion where the open deformation of the trim part occurs afterwards.

When varying the opening width partially, however, the manufacturing process becomes complicated and the manufacturing facility also becomes complicated. By this structure, there may be caused a risk that the production costs of weather strips are increased. Moreover, there have existed cases where only narrowing the opening width is not sufficient as the countermeasures against the open deformation of the trim part. In addition, also in a case where the compressing or clamping work is performed afterwards, since a step for the work is added, there exists a risk that the production costs are increased.

SUMMARY OF THE INVENTION

The invention was made with a view to solving the problem and an object thereof is to provide a weather strip which can suppress the increase in costs and realize the suppression of the open deformation of the trim part.

Hereinafter, means which are suitable for attaining the object will be itemized for description below. Note that a function and advantage inherent in the means so itemized will be added as required after each description.

(1) A weather strip comprising:

a trim part including a pair of side wall portions and a bottom wall portion connecting the side wall portions to each other, and in which an insert is embedded along a longitudinal direction of the trim part;

the insert including a plurality of skeletal pieces arranged substantially in parallel to one anther and a connecting portion integrating the skeletal pieces;

each skeletal piece including a bottom wall part embedded in the bottom wall portion, and a pair of side wall parts embedded in the side wall portions, respectively, wherein an angle defined by the bottom wall member and one of the side wall parts forms an acute angle.

According to (1), in assembling the weather strip to a vehicle body, when the weather strip is curved with the bottom wall portion situated on an inside of the curve and distal ends of the side wall portions on an outside of the curve, a stress is imparted which compresses the bottom wall portion and extends the side wall portions. As this occurs, the connecting portion of the insert exists within the bottom wall portion and therefore, the bottom wall portion is difficult to be compressed and the extending stress imparted to the side wall portions becomes large. In particular, in the event that the curvature of the curve is large and the stress that is imparted to the side wall portions exceeds an extension limit of the side wall portions, the stress is converted into a force which moves the distal ends of the side wall portions in a direction to approach the inside of the curve where the amount of extension is small (namely, toward the side of the bottom wall portion). In this regard, in the above weather strip, the skeletal piece of the insert is formed such that the angle defined by the bottom wall member that is embedded within the bottom wall portion and one of the side wall parts embedded in the side wall portions, forms an acute angle. By this structure, even in the event that the aforesaid stress is so imparted, both the side wall portions fall in a direction in which the acute angle is narrowed. Consequently, at least one of the distal ends of both the side wall portions is moved in a direction in which the distal end approaches to other distal end, whereby the opening width of the trim part is narrowed. As a result, it is possible to prevent the occurrence of open deformation of the trim part at the curved location. Hence, with (1), which is different from the conventional technique in which the opening width is partially varied or the location where the open deformation of the trim part occurs is compressed or clamped afterwards, the increase in the number of steps and hence in costs can be suppressed. In addition, when mounting the weather strip on the flange along the corner portion of the peripheral portion of the door opening in the vehicle body, there is no case where a gap is generated between the flange and the weather strip itself, and therefore, the improvement in external appearance can be realized, and the reduction in holding force can also be suppressed. Note that the "acute angles" mean angles at which a predetermined dimension can be secured for the opening width between the distal ends of the side wall portions, and for example, angles in the range of not less than 70 degrees to not more than 89 degrees are preferable, and angles in the range of not less than 80 degrees to not more than 84 degrees are more preferable.

(2) A weather strip comprising:

a U-shaped trim part including a pair of side wall portions and a bottom wall portion connecting the side wall portions to each other, and in which an insert is embedded along a longitudinal direction of the trim part;

the insert including a plurality of skeletal pieces arranged substantially in parallel to one anther and a connecting portion integrating the skeletal pieces;

each skeletal piece including a bottom wall part embedded in the bottom wall portion, and a pair of side wall parts embedded in the side wall portions, respectively, wherein an intersection point between the bottom wall part and one of perpendiculars which are extended from a distal end portion of one of the side wall parts to the bottom wall part is positioned between opposite end portions of the bottom wall part.

According to (2), basically, the same function and advantage as those of (1) are provided. In addition, the insert is formed such that the intersection point between the perpendiculars which are extended from the distal end portions of the respective side wall parts to the bottom wall part is positioned inward of both the end portions of the bottom wall part. By this structure, when mounting the weather strip on the flange of the corner portion, even in the event that the weather strip is curved to thereby be given a stress which exceeds the extension limit of the side wall portions, the side wall portions are made to fall so that the distal end portions of the side wall portions are moved inward more assuredly. As a result, the suppression of occurrence of open deformation of the trim part can be realized more assuredly. Note that the same function and advantage can be obtained even in the event that the description reading that the intersection point between perpendiculars is positioned inward of opposite end portions of the bottom wall part is substituted by a description reading that the intersection point between perpendiculars is positioned inward of proximal portions of the respective side wall portions.

(3) A weather strip according to (1) or (2), wherein one of the side wall portions includes a thick portion formed in a vicinity of a distal end of the one of the side wall portions so as to protrude outward of the trim part, and a seal part expanded outward of the trim part so as to have a hollow portion one end of which is connected to the thick portion and another end of which is connected to a vicinity of a proximal portion of one of the side wall portions, wherein, in a cross section which intersects with the longitudinal direction of the trim part at right angle, a straight line Le is defined by connecting a center of gravity Pb of the one of the side wall portions, and, an intersection point Pc between a straight line Lc extending along the bottom wall part and a straight line Ld extending along the side wall part of said one of the side wall portions, and an angle θd defined by the straight line Le and the straight line Lc forms an acute angle.

According to (3), when attempting to curve the weather strip that is constructed above, the thick portion, which largely affects the extension of the distal end of the one side wall portion, is moved in a direction in which the angle θd becomes smaller or is moved inward. Consequently, the one side wall portion can be moved in a direction in which the opening width is assuredly narrowed. By this structure, the suppression of occurrence of open deformation of the trim part can be realized.

(4) A weather strip according to (3), wherein the trim part is a material which is more rigid than the seal part.

According to (4), the trim part is made of the material which is more rigid than the seal part. When attempting to curve the weather strip, in the event that the one side wall portion is moved in the direction in which the opening width is narrowed, a stress is imparted to the seal part in such a way to collapse the hollow portion. In this regard, in (4), the one end of the seal part is connected to the thick portion having the relatively high rigidity which is formed at the distal end of the one side wall portion. By this structure, since the deformation of the seal part is suppressed by virtue of the rigidity of the thick portion, the shape of the seal part is held, thereby making it possible to suppress the collapse of the hollow portion. Consequently, the deformation of the seal part can also be suppressed at the corner portion of the peripheral portion of the door opening in the vehicle body, and as a result, the reduction in sealing properties can be suppressed.

BRIEF DESCRIPTION OF THE DRAWINGS

FIGS. 1A and 1B show the construction of a weather strip according to an embodiment of the invention, in which FIG. 1A is a cross section taken along the line IA-IA in FIG. 3 and FIG. 1B is a perspective view of the same;

FIGS. 6A and 6B explain a conventional weather strip, in which FIG. 6A is a general cross section and FIG. 6B is a cross section showing a case where an open deformation of the trim part is generated.

DETAILED DESCRIPTION OF THE PREFERRED EMBODIMENTS

Figure 2:
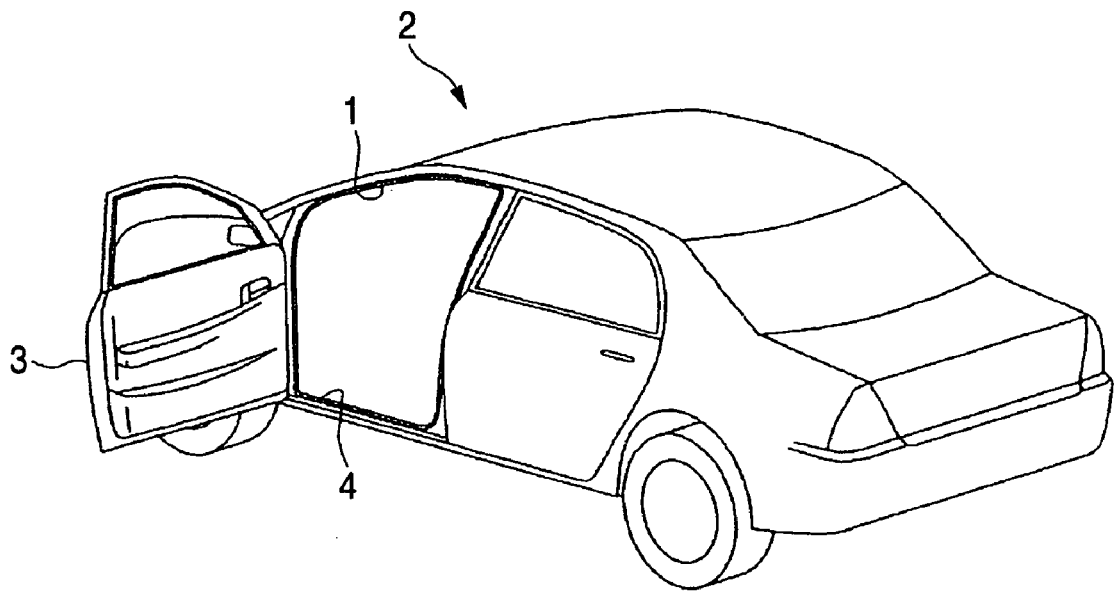
FIG. 2 is a perspective view showing an automobile.
Figure 3:
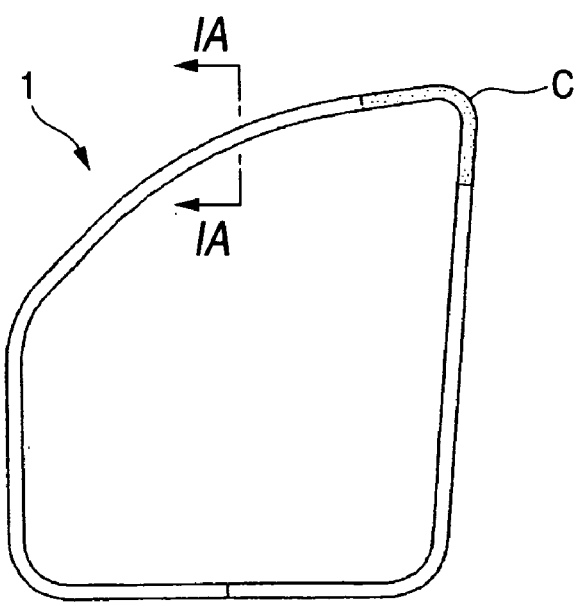
FIG. 3 is a side view of the weather strip mounted on a flange.

Hereinafter, an embodiment of the invention will be described by reference to the drawings. As shown in FIGS. 2, 3, a weather strip 1 according to the embodiment is mounted on a flange of a peripheral portion along a door opening 4 on the side of a vehicle body that corresponds to a side door 3 of an automobile 2. In addition, the weather strip 1 is formed into an elongated shape having a constant cross section by extrusion molding.

Figure 1A:
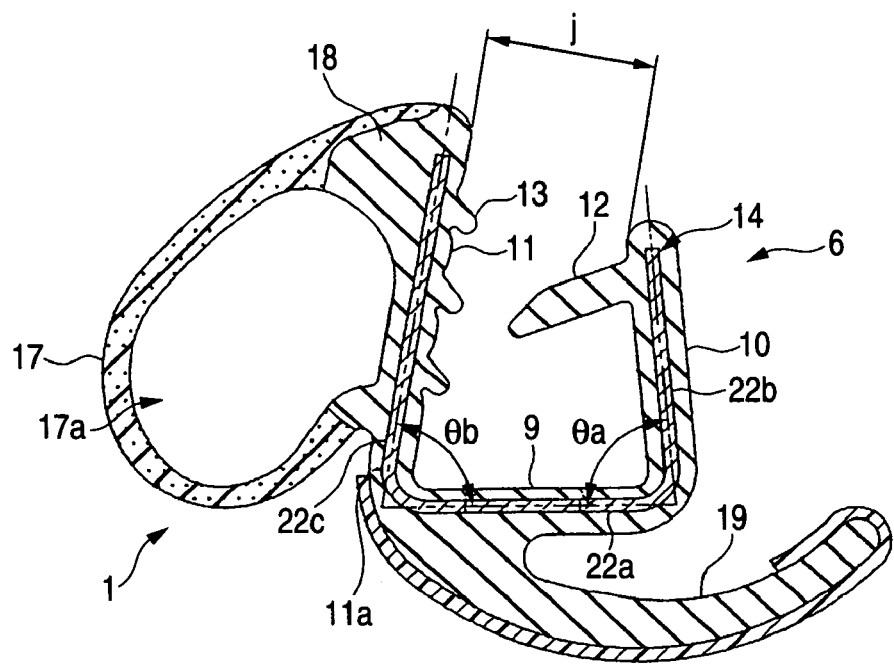
Figure 1B:
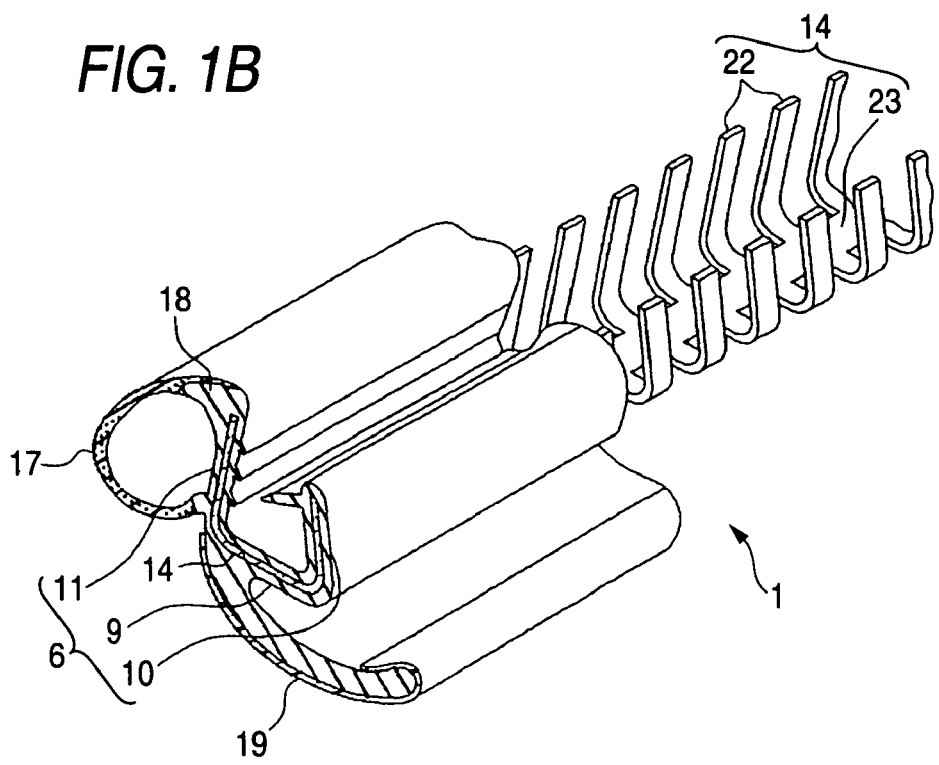

To describe the construction of the weather strip 1 based on FIGS. 1A, 1B, the weather strip 1 has a trim part 6 that is to be mounted on the flange. The Trim part 6 includes a bottom wall portion 9, and an interior side wall portion 10 and an exterior side wall portion which constitute a pair of side wall portions and has a substantially U-shaped cross section as a whole. A holding lip 12 which extends inside the trim part 6 is formed on the interior side wall portion 10, and a plurality of auxiliary lips 13 are formed on an inside of the exterior side wall portion 11. In addition, the trim part 6 is made of a solid material of ethylene-propylene-diene terpolymer and has a metallic insert 14 embedded in the interior thereof.

A seal part 17 formed of a sponge material of EPDM, which is softer than the trim part 6, is provided on an external wall surface of the exterior side wall portion 11. The seal part 17 has a hollow portion 17a and is connected to the exterior side wall portion 11 at two locations, that is, along a distal side end and a side end on the side of the bottom wall portion 9. One side end of the seal part 17 is connected to a thick portion 18 which is formed so as to protrude outward along a distal end (an upper end in the figure) of the exterior side wall portion 11. Another side end of the seal part 17 is connected to a vicinity of a proximal end portion 11a of the exterior side wall portion 11. The thick portion 18 is also formed of a solid material of EPDM. When the door 3 is closed, the seal part 17 is collapsed and deformed, whereby a seal is established between the door 3 and the body of the automobile 2.

Furthermore, a cover lip 19, which extends inward of the vehicle, is connected to an outside of the bottom wall portion 9. The cover lip 19 is designed to cover end portions of interior members such as ceiling and garnishes, which are not shown, by a distal end portion thereof.

Here, the insert 14, which constitutes a feature of the invention, will be described. The insert 14 is of a so-called center bonded type which has a plurality of strip-like skeletal pieces 22 which are arranged substantially in parallel and a central connecting portion 23 which functions as a connecting portion for connecting the skeletal pieces 22 to each other in the vicinity of a widthwise center of the skeletal pieces 22. The central connecting portion 23 is provided substantially at a widthwise center of the bottom wall portion 9.

Figure 6A:
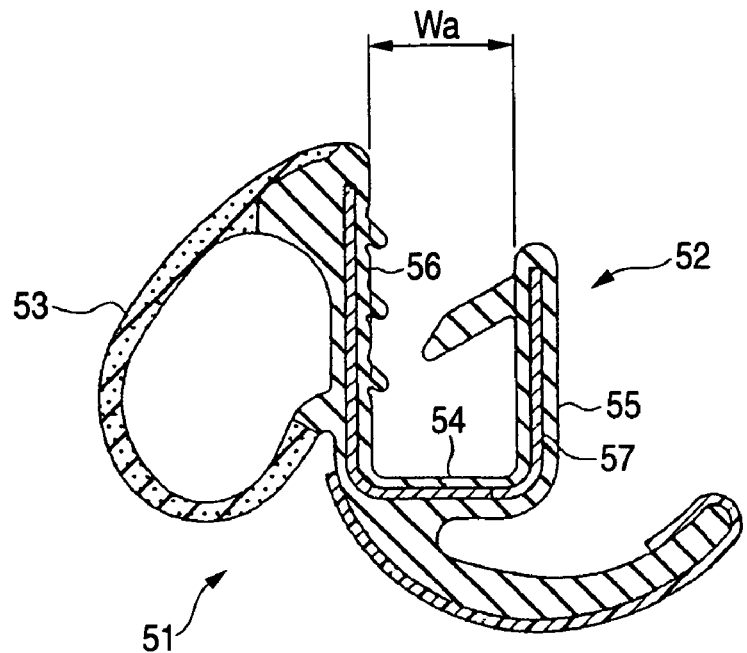
Figure 6B:
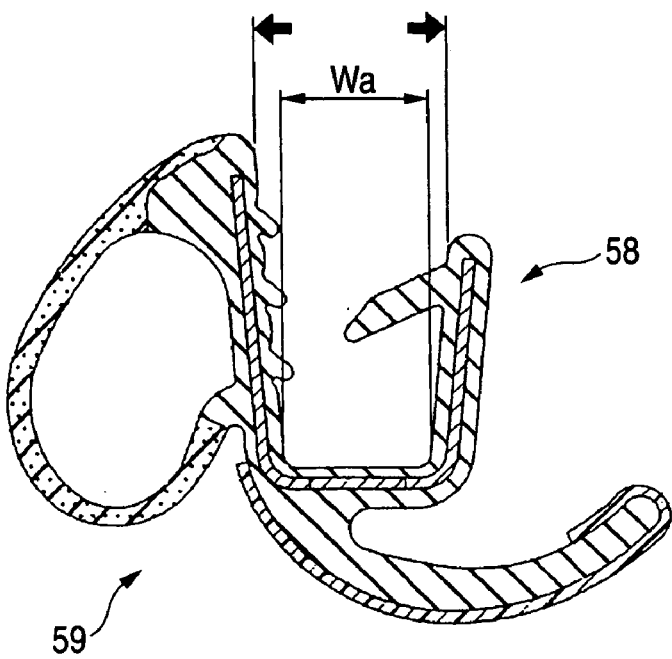

The skeletal piece 22 is formed into a U-like shape which conforms to the cross section of the trim part 6. In this embodiment, when viewed in the cross section of the trim part 6, an angle θa formed by a bottom wall part 22a embedded substantially linearly within the bottom wall portion 9 and an internal part 22b embedded substantially linearly within the interior side wall portion 10 as a side wall part is made to be an acute angle. Similarly, an angle θb formed by the bottom wall part 22a and an external part 22c embedded substantially linearly within the exterior side wall portion 11 as a side wall part is also made to be an acute angle. However, an opening width j between distal end portions of the interior side wall portion 10 and the exterior side wall portion 11 is set to be a dimension which provides appropriate mounting properties and a holding force relative to the flange which is formed into a substantially rectilinear shape. Namely, the opening width j is dimensioned substantially equally to the opening width Wa of the conventional weather strip 51 in which the interior side wall portion 55 and the exterior side wall portion 56 are formed substantially in parallel with each other (refer to FIG. 6A). Consequently, although the angles are referred to as the acute angles, the angles are those at which a predetermined dimension can be secured for the opening width j, and angles in the range of not less than 70 degrees to not more than 89 degrees are preferable, and angles in the range of not less than 80 degrees to not more than 84 degrees are more preferable.

Next, the function and advantage of the weather strip 1 that is constructed as has been described heretofore will be described. Of the weather strip 1, a corner portion C (refer to FIG. 3) that is mounted on a flange of a curved portion having a large curvature is curved in such a manner that the bottom wall portion 9 occupies an inside of the curve while the distal end portions of the interior side wall portion 10 and the exterior side wall portion 11 occupy an outside of the curve. Namely, a stress is imparted to the corner portion C by the curving of thereof in such a way that the bottom wall portion 9 on the inside of the curve is compressed and the distal end portions of the interior side wall portion 10 and the exterior side wall portion 11, which are on the outside of the curve, are extended.

However, since the central connecting portion 23 of the insert 14 resides within the bottom wall portion 9, the bottom wall portion is difficult to be contracted. On the other hand, since the interior side wall portion 10 and the exterior side wall portion 11 are made of the solid material of EPDM which is relatively hard, they are difficult to be extended. Therefore, the stress generated at the time of curving the corner portion is converted into a force which acts to move the distal end portions of the interior side wall portion 10 and the exterior side wall portion 11 to the inside of the curve where the extension is relatively small, that is, in a direction in which the distal end portions thereof approach the side of the bottom wall portion 9.

In this embodiment, the angle θa formed by the bottom wall part 22a and the internal part 22b of the insert 14 is made to be an acute angle. By this structure, the interior side wall portion 10 is caused to fall not in a direction in which the angle θa is widened but in a direction in which the angle θa is narrowed, whereby the opening width j of the trim part 6 is narrowed. As a result, the suppression of occurrence of open deformation of the trim part at the corner portion can be realized.

In addition, when the exterior side wall portion 11 is moved in a direction in which the opening width j is narrowed in the corner portion, a stress is imparted to the seal part 17 in such a way that the hollow portion 17a is collapsed. In this regard, in this embodiment, the one side end of the seal part 17 is connected to the thick portion 18 having the relatively high rigidity which is formed along the distal end of the exterior side wall portion 11. By this structure, since the deformation of the seal part 17 is suppressed by the rigidity of the thick portion 18, the shape of the seal part 17 is held, thereby making it possible to suppress the collapse of the hollow portion 17a. Consequently, the reduction in sealing properties at the corner portion C can be suppressed.

Thus, as has been described in detail heretofore, since the insert 14 is formed in the predetermined angles, in the corner portion C, the interior side wall portion 10 and the exterior side wall portion 11 are caused to fall in the direction in which the opening width j is narrowed, thereby making it possible to suppress the open deformation of the trim part. By this structure, being different from the conventional technique in which the opening width is partially varied or the location where the open deformation of the trim part occurs is compressed or clamped afterwards, according to the invention, the increase in the number of steps and hence in costs can be suppressed. In addition, there is no case where a gap is generated in the corner portion C, and therefore, the improvement in external appearance can be realized, and the reduction in holding force can also be suppressed.

In addition, in a case where the distal end of the cover lip 19 extends inward of the vehicle, the interior side wall portion 10 tends to easily fall in a direction in which the open deformation of the trim part is generated in the corner portion C. In this regard, in the embodiment, since the insert 14 is formed into the shape as has been described above, the interior side wall portion 10 is caused to fall in the direction in which the angle θa is narrowed, thereby making it possible to ensure the suppression of open deformation of the trim part without being affected by the cover lip 19.

Furthermore, since the opening width j is set to the appropriate dimension which facilitates the mounting on the substantially rectilinear flange, being different from a case where the opening width is set to be narrow along the full longitudinal length of the weather strip 1, a drawback can be suppressed that the assembling properties are deteriorated at other locations than the corner portion C.

Note that the invention does not have to be limited to the contents of the description of the embodiment but may be embodied as follows.

Figure 4:
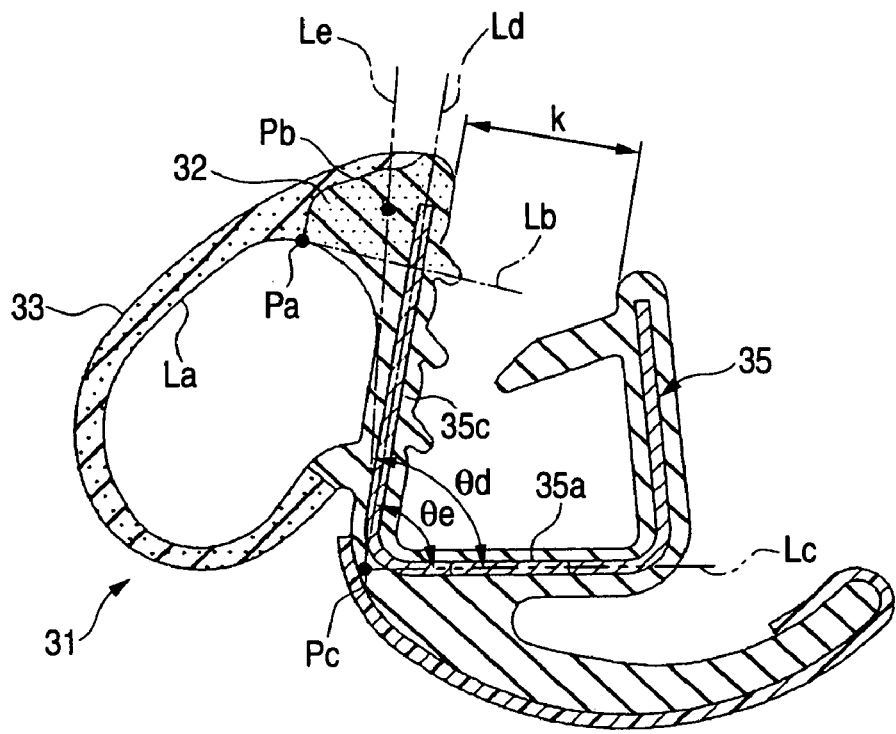
FIG. 4 is a cross section of a weather strip according to another embodiment in which a thick portion is formed to be located at a predetermined position.

(a) While in the embodiment, the positions of the interior side wall portion 10 and the exterior side wall portion 11 are set in consideration of only the angles of the insert 14, the positions of the interior side wall portion 10 and the exterior side wall portion 11 may be set in consideration of not only the angles of the insert 14 but also the portion which covers the insert 14. For example, in this embodiment, as shown in FIG. 4, there exists a thick portion 32 which largely affects the extension of the distal end of the exterior side wall portion 11. By this structure, by taking the thick portion 32 into consideration, the suppression of open deformation of the trim part can be realized more assuredly. To be specific, in a cross section which intersects a longitudinal direction of a weather strip 31 at right angles, a center of gravity of an area (an area to which a dispersed dots pattern is imparted in the figure) formed of a solid material of EPDM which is situated nearer to the distal end than a tangent Lb to a boundary point Pa between the thick portion 32 and a seal part 33 on a hollow portion line La which defines a hollow portion 17a is made to be a point Pb. An intersection point between a straight line Lc extending along a bottom wall part 35a of an insert 35 and a straight line Ld extending along an external part 35c of the insert is made to be a point Pc. In this case, the position of the exterior side wall portion 11 may be set such that an angle θd formed by a straight line Le connecting the point Pb with the point Pc and a straight line Lc extending along the bottom wall part 35a forms an acute angle, whereby in the corner portion C, the thick portion 32 is moved in a direction in which the angle θd is reduced. In addition, in this case, an angle θe formed by the bottom wall part 35a of the insert 35 and the external part 35c also forms an acute angle. Consequently, in the corner portion C, the exterior side wall portion 11 can be moved more assuredly in a direction which reduces an opening width k, thereby making it possible to realize the suppression of open deformation of the trim part more assuredly.

Figure 5:
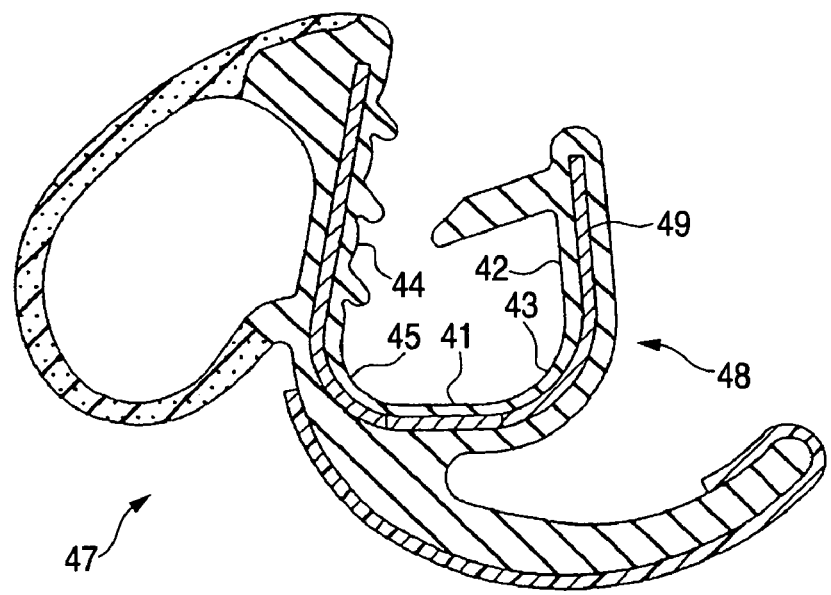
FIG. 5 is a cross section of a weather strip according to a further embodiment in which radii which form a curved portion between a bottom wall portion and an interior side wall portion and a curved portion between the bottom wall portion and an exterior side wall portion are made larger.

(b) While in the embodiment, no description is made as to radii which form the curved portion, which is defined as the acute angle, between the bottom wall portion 9 and the interior side wall portion 10 and the curved portion, which is also defined as acute angle, between the bottom wall portion 9 and the exterior side wall portion 11, as shown in FIG. 5, a weather strip 47 may be provided in which radii, which form a curved portion 43 between a bottom wall portion 41 and an interior side wall portion 42 and a curved portion 45 between the bottom wall portion 41 and an exterior side wall portion 44, are set larger than those of the weather strip 1 shown in FIG. 1A, whereby the full length of a trim part 48 in a cross section which intersects a longitudinal direction of the weather strip 47 can be shortened, and as this occurs, the increase in the length of a skeletal piece 49 of an insert can be suppressed. Consequently, the existing insert (refer to FIG. 6A, that is, an insert in the same size as the existing one) can be adopted that is used in the conventional weather strip 51 having the trim part 52 in which the interior side wall portion 55 and the exterior side wall portion 56 are formed substantially in parallel. Consequently, in the invention, even in the event that the corner portions are formed by curved portions, the curved portions are understood to be included in the acute angles, provided that the curved portions look like acute angles on the whole.

(c) While in the embodiment, the solid material of EPDM is adopted as the material of the trim part 6 and the sponge material of EPDM is adopted as the material of the seal part 17, other materials may be adopted, provided that the trim part 6 is made of a material which has a relatively high rigidity and the seal part 17 is made of a material which is relatively flexible. For example, a solid material and a sponge material, which are both of TPO, may be used. In addition, a combination of PP (polypropylene) and a sponge material of TPO may be used.

(d) While in the embodiment, the weather strip 1 includes the seal part 17 and the cover lip 19, there will be no problem in case a shape is adopted for the weather strip in which the seal part 17 and the cover lip 19 are omitted.

What is claimed is:

1. A weather strip comprising:
    a U-shaped trim part including a pair of side wall portions and a bottom wall portion connecting said side wall portions to each other, and in which an insert is embedded along a longitudinal direction of said trim part, wherein
    said insert includes a plurality of skeletal pieces arranged substantially in parallel to one another and a connecting portion integrating said skeletal pieces;
    each skeletal piece includes a bottom wall part embedded in said bottom wall portion and a pair of side wall parts embedded in said side wall portions, respectively;
    an angle defined by said bottom wall part and one of said side wall parts forms an acute angle;
    one of said side wall portions includes a thick portion formed in a vicinity of a distal end of said one of the side wall portions so as to protrude outward of said trim part;
    a seal part expanded outward of said trim part so as to have a hollow portion one end of which is connected to said thick portion and another end of which is connected to a vicinity of a proximal portion of one of said side wall portions;
    in a cross section, which intersects with the longitudinal direction of said trim part at a right angle, a straight line is defined by connecting a center of gravity Pb of said one of the side wall portions and an intersection point Pc between a straight line Lc extending along said bottom wall part and a straight line Ld extending along the side wall part of said one of the side wall portions; and
    an angle θd defined by the straight line Le and the straight line Lc forms an acute angle.

2. A weather strip according to claim 1, wherein opposite angles defined by said bottom wall part and said respective side wall parts form acute angles.

3. A weather strip according to claim 2, wherein said opposite angles have substantially the same angle to each other.

4. A weather strip according to claim 1, wherein the center of gravity Pb of said one of the side wall portions is situated nearer to the distal end of said one of the side wall portions than a tangent Lb at a boundary point Pa between the thick wall portion and the seal part on a hollow portion line La, which defines an inner surface of said hollow portion.

5. A weather strip according to claim 1, wherein said trim part is more rigid than said seal part.

6. A weather strip comprising:
    a U-shaped trim part including a pair of side wall portions and a bottom wall portion connecting said side wall portions to each other, and in which an insert is embedded along a longitudinal direction of said trim part, wherein said insert includes a plurality of skeletal pieces arranged substantially in parallel to one another and a connecting portion integrating said skeletal pieces;

each skeletal piece includes a bottom wall part embedded in said bottom wall portion and a pair of side wall parts embedded in said side wall portions, respectively;

an intersection point between one of perpendiculars which are extended from a distal end portion of one of said side wall parts to said bottom wall part is positioned between opposite end portions of said bottom wall part;

one of said side wall portions includes a thick portion formed in a vicinity of a distal end of said one of the side wall portions so as to protrude outward of said trim part;

a seal part expanded outward of said trim part so as to have a hollow portion, one end of which is connected to said thick portion and another end of which is connected to a vicinity of a proximal portion of one of said side wall portions;

in a cross section, which intersects with the longitudinal direction of said trim part at a right angle, a straight line is defined by connecting a center of gravity Pb of said one of the side wall portions and an intersection point Pc between a straight line Lc extending along said bottom wall part and a straight line Ld extending along the side wall part of said one of the side wall portions; and an angle $\theta d$ defined by the straight line Le and the straight line Lc forms an acute angle.

7. A weather strip according to claim 6, wherein the center of gravity Pb of said one of the side wall portions is situated nearer to the distal end of said one of the side wall portions than a tangent Lb at a boundary point Pa between the thick wall portion and the seal part on a hollow portion line La, which defines an inner surface of said hollow portion.

8. A weather strip according to claim 6, wherein said trim part is more rigid than said seal part.

* * * * *